(12) United States Patent
Nakamura et al.

(10) Patent No.: US 6,501,265 B2
(45) Date of Patent: Dec. 31, 2002

(54) ANGULAR POSITION DETECTION DEVICE HAVING LINEAR OUTPUT CHARACTERISTICS

(75) Inventors: Tsutomu Nakamura, Kariya (JP); Toshihisa Ishihara, Okazaki (JP); Kenji Takeda, Okazaki (JP); Yoshiyuki Kono, Obu (JP)

(73) Assignee: Denso Corporation, Aichi-Pref. (JP)

( * ) Notice: Subject to any disclaimer, the term of this patent is extended or adjusted under 35 U.S.C. 154(b) by 0 days.

(21) Appl. No.: 09/811,577

(22) Filed: Mar. 20, 2001

(65) Prior Publication Data

US 2001/0026153 A1 Oct. 4, 2001

(30) Foreign Application Priority Data

Apr. 4, 2000 (JP) ......................... 2000-102385

(51) Int. Cl.⁷ ............... G01B 7/14; G01B 7/30
(52) U.S. Cl. ................. 324/207.2; 324/207.25
(58) Field of Search .............. 324/207.2, 207.22, 324/207.25, 165, 175, 173, 174, 166, 207.13; 340/672; 338/32 R, 32 H (56) References Cited

U.S. PATENT DOCUMENTS

| | | | | |
|---|---|---|---|---|
| 4,719,419 A | * | 1/1988 | Dawley | .................. 324/207.25 |
| 5,140,262 A | * | 8/1992 | Stolfus | .................... 324/207.2 |
| 5,523,679 A | | 6/1996 | Kalb | |
| 5,528,139 A | | 6/1996 | Oudet et al. | |
| 5,789,917 A | | 8/1998 | Oudet et al. | |
| 5,861,745 A | * | 1/1999 | Herden | .................. 324/207.25 |
| 6,043,645 A | | 3/2000 | Oudent et al. | |
| 6,130,535 A | | 10/2000 | Herden et al. | |

FOREIGN PATENT DOCUMENTS

| | | |
|---|---|---|
| DE | 19726691 | 1/1999 |
| DE | 19832090 | 1/2000 |
| FR | 1339956 | 9/1963 |
| JP | 61-75213 | 4/1986 |
| JP | 1-244314 | 9/1989 |
| JP | 5-126513 | 5/1993 |
| JP | 8-105706 | 4/1996 |

* cited by examiner

Primary Examiner—Edward Lefkowitz
Assistant Examiner—Subhash Zaveri
(74) Attorney, Agent, or Firm—Nixon & Vanderhye PC

(57) ABSTRACT

An angular position detection device has a rotor that comprises two magnets and a primary yoke, and a stator that comprises a pair of auxiliary yokes and a magnetism detection element. The rotor is fixed to a rotary shaft of an object to be detected. The primary yoke forms a magnetic circuit in a ring, and the magnets are configured so that the intensity distribution of the magnetic field is asymmetric with respect to the center of rotation of the rotor. The magnetism detection element is placed in a gap between the auxiliary yokes. This stator is disposed in the inside of the rotor so that an air gap between the rotor and the stator varies gradually in the circumferential direction. Thus, the magnetism detection element is enabled to produce a linear output over a range wider than 180°.

15 Claims, 5 Drawing Sheets

FIG. 9A PRIOR ART  0°-POSITION
FIG. 9B PRIOR ART  90°-POSITION
FIG. 9C PRIOR ART  135°-POSITION

FIG. 9D PRIOR ART

ANGULAR POSITION DETECTION DEVICE HAVING LINEAR OUTPUT CHARACTERISTICS

CROSS REFERENCE TO RELATED APPLICATION

The present application relates to and incorporates herein by reference Japanese Patent Application No. 2000-102385 filed Apr. 4, 2000.

BACKGROUND OF THE INVENTION

1. Field of the Invention

The present invention relates to an angular position detection device which detects an angular position of an object by use of a magnetism detection element.

2. Related Art

An angular position detector [is] has been proposed in JP-A-61-75213. This angular position detector is constructed so that a cylindrical magnet is magnetized in the radial direction, and a magnetism detection element is disposed in the middle of the magnet, and the magnet (or the magnetism detection element) rotates with rotation of an object to be detected. In this construction, when the magnet rotates, the amount of magnetic flux passing through the magnetism detection element varies and an output signal from the magnetism detection element varies with the amount of the magnetic flux. Thus the angular position of the object can be detected by means of the output signal.

When detecting the angular position of the object, by means of the output signal in this way, in order to expand the range of angular position detection, characteristics of the output variation in the magnetism detection element against the angular position should be made linear over as wide a range as possible.

However, in the above prior art, since the parallel magnetic field is rotated about the magnetism detection element, the magnetism detection directional component of the magnetic flux passing through the magnetism detection element decreases in trigonometric function as the angular position advances. As a result, the characteristics of the output variation in the magnetism detection element against the angular position deviates from the straight line and curves in trigonometric function. Therefore the prior art has a problem that it provides only a pseudo-linear output over a narrow range of the angular position.

In contrast to this, in U.S. Pat. No. 5,861,745, as shown in FIGS. 9A to 9D, an angular position sensor which is constructed so that semicircular auxiliary stators 110 are installed on both sides of a magnetism detection element 100 so that the air gap between a cylindrical magnet 120 and the auxiliary stators 110 is uniform. In this angular position sensor, the direction of the magnetic flux passing through the magnetism detection element is always perpendicular to the direction of magnetism detection by the auxiliary stators, and the amount of the magnetic flux passing between the auxiliary stators 110 changes with rotation. Thus it provides a linear output over a wider range of the angular position.

However, in the above angular position sensor, since a magnetic circuit is formed in point symmetry, the positional relation is the same except that the poles of the magnet 120 are reversed when it is rotated 180°. Accordingly, as shown in FIGS. 9A to 9D, the maximum or minimum points (peak points) appear at every 180°. That is, a range in which the output is linear is a maximum of 180° (between −90° and 90°), and it is impossible to provide a linear output over a wider range than this. Practically speaking, since the characteristics in the vicinity of the peak points) are not perfectly linear, the actual linear range is more limited to 160°.

SUMMARY OF THE INVENTION

The present invention overcomes the above drawbacks, and has as an object to provide an angular position detection device which is capable of establishing linear characteristics of an output of a magnetism detection element over a range wider than 180°, thereby improving characteristics of angular position detection.

The angular position detection device according to the present invention comprises one or two magnets for generating a magnetic field and one or more magnetism detection elements disposed in the magnetic field for detecting magnetism. The magnets are installed in a rotor and the magnetism detection elements are installed in a stator, or vice versa. The stator is disposed in the inside of the rotor, which is fixed to a rotary shaft of an object to be detected. The stator or rotor in which the magnets are installed has a primary yoke that forms a magnetic circuit of the magnets, and is configured so that the intensity distribution of the magnetic field is asymmetric with respect to the center of rotation of the rotor. On the other hand, the stator or rotor in which the magnetic detection elements are installed has a pair of auxiliary yokes, and the magnetic detection elements are disposed in the gap provided between the pair. The stator and the rotor are configured so that the air gap between them varies gradually in the circumferential direction.

According to this construction, since the point symmetry in the magnetic circuit does not hold, the angular interval between the peak points in output characteristics of a magnetism detection element is larger than 180° and thus a linear range wider than 90° can be provided. As a result, characteristics of detection of the angular position can be improved.

BRIEF DESCRIPTION OF THE DRAWINGS

The invention, together with additional objects, features and advantages thereof, will be best understood from the following description, the appended claims and the accompanying drawings in which:

DETAILED DESCRIPTION OF THE PREFERRED EMBODIMENT

The present invention will be described with reference to embodiments and modifications in which the same or similar parts are designated by the same reference characters.

First Embodiment

Figure 1:
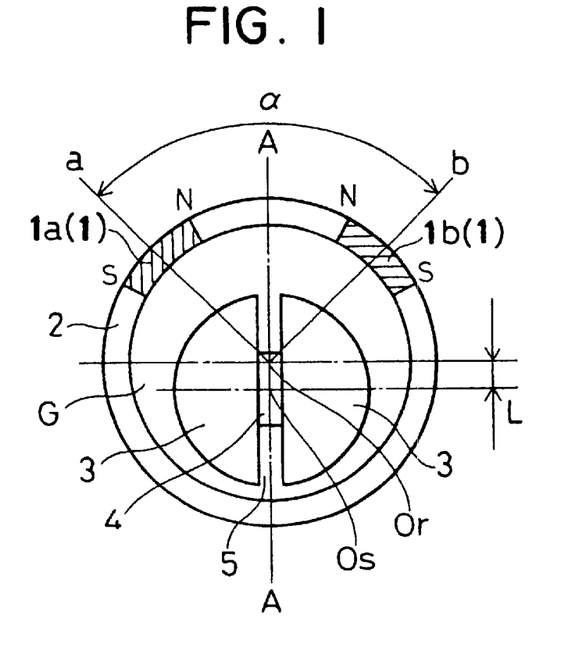
FIG. 1 is a plan view showing a construction of a main part of an angular position detection device according to a first embodiment of the present invention.

FIG. 1 is a plan view showing a construction of a main part of an angular position detection device according to a first embodiment of the present invention. The angular position detection device is used as, for example, a throttle position sensor in a motor vehicle. As shown in FIG. 1, the device has a rotor that comprises two magnets 1 (a first magnet 1a, a second magnet 1b) and a primary yoke 2, and a stator that comprises a pair of auxiliary yokes 3 and a magnetism detection element 4. The rotor is fixed to a rotary shaft of a throttle valve (not shown).

Each of the magnets 1 is installed in arcuate arrangement, and magnetized so that one end in the circumferential direction is the north pole and the other end is the south pole.

The primary yoke 2 is made of a magnetic material such as permalloy or iron, and it closes the distance between the two magnets 1 in a ring to form a magnetic circuit. The magnets 1 are placed so fit that the angle (central angle) α, which is formed between the radius a that connects the first magnet 1a and the center Or of the rotor and the radius b that connects the second magnet 1b and the center Or of the rotor, is less than 180° (for example, 90°). The same poles of the two magnets face each other in the circumferential direction as shown in FIG. 1. In this case, magnetic flux produced by the two magnets are conducted along the primary yoke and repel each other. As a result, a uniform magnetic field in which the magnetic flux flows radially is generated in the internal space of the primary yoke. Furthermore, the intensity distribution of the magnetic field is asymmetric with respect to the center of rotation of the rotor.

The pair of auxiliary yokes 3, which induce magnetic flux in the magnetism detection element 4, are made of a magnetic material such as permalloy or iron, similarly to the primary yoke 2, and installed in nearly semicircular arrangement respectively. The pair of auxiliary yokes 3 are disposed so that their respective flat surfaces face each other in parallel and a gap 5 is provided between them. The pair of yokes 3 are constructed so that the general shape of the pair of auxiliary yokes 3 is circular.

The magnetism detection element 4 is, for example, a well-known Hall element, which outputs a voltage signal corresponding to the intensity of the magnetic field. The magnetism detection element 4 is placed in the gap 5 provided between the auxiliary yokes 3, and disposed so that the direction of magnetism detection by the element is perpendicular (toward the horizontal direction in FIG. 1) to the direction of the gap (the vertical direction in FIG. 1).

The stator, which comprises the pair of auxiliary yokes 3 and the magnetism detection element 4, is disposed within the rotor, and an air gap G is provided between the rotor and the stator. The air gap G is provided to vary gradually along the circumferential direction. Specifically, as shown in FIG. 1, the stator is disposed so that the direction of the gap in the stator is aligned with the centerline A—A of the rotor, and the center Os of the stator is offset a predetermined distance L from the center Or of the rotor. Hereafter, in the following explanation of operation, the position of the rotor shown in FIG. 1 is assumed to be '0°—position', and the direction of rotation of the rotor is clockwise in FIG. 1.

Next the operation and the effect of the angular position detection device constructed as described above is described with reference to FIGS. 2A to 2D.

Figure 2A:
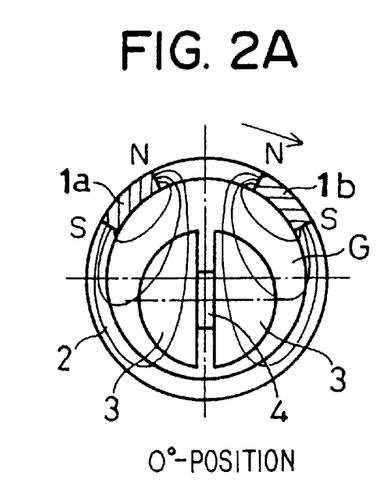
FIGS. 2A to 2D are charts showing a relation between a rotational operation and an output in the angular position detection device according to the first embodiment.

First, when the rotor is in '0°—position', the pair of auxiliary yokes 3 is in the line symmetrical position with respect to the centerline A—A of the rotor shown in FIG. 1. In this case, in the inside of the rotor, the direction of the magnetic flux passing through the auxiliary yokes 3 is perpendicular to the direction of magnetism detection by the magnetism detection element 4 as shown in FIG. 2A. Therefore detected magnetic force is zero as shown in FIG. 2D.

Thereafter, when the rotor rotates with rotation of the throttle valve, the direction of the magnetic flux in the inside of the rotor varies, and the air gap G between the auxiliary yokes 3 and the magnets 1 also varies. Here, in case of a conventional device (FIGS. 9A to 9D) in which the center of rotation of the rotor coincides with the center of the stator, detected magnetic force is the largest when the rotor rotates up to '90°—position' where the direction of the magnetic flux in the inside of the rotor is parallel with the direction of magnetism detection by the magnetism detection element 4. If the rotor further rotates, the detected magnetic force decreases. When the rotor rotates up to '180°—position', the detected magnetic force becomes zero again.

Figure 2B:
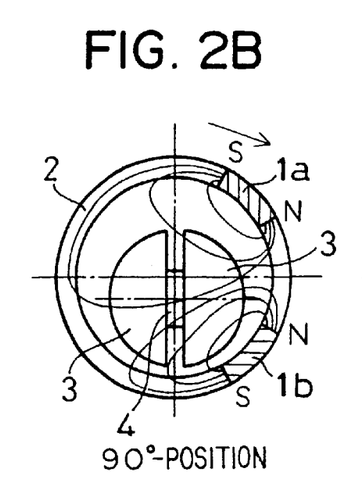

In contrast to this, in the angular position detection device according to the present embodiment, the center of the stator is offset from the center of rotation of the rotor. Therefore, the detected magnetic force is not the largest when the rotor rotates up to '90°—position' as shown in FIG. 2B. That is, the direction of the magnetic flux against the magnetism detection element 4 in the inside of the rotor changes with rotation of the rotor similarly to the conventional device. However, the air gap G between the magnets 1 and the auxiliary yokes 3 gradually becomes smaller while the rotor rotates from '90°—position' to '180°—position' because the center of rotation of the rotor is offset from the center of the stator. When the air gap G becomes small, the amount of the magnetic flux passing through the inside of the auxiliary yokes 3 increases. Therefore the detected magnetic force continues to increase while the rotor rotates beyond '90°—position' as shown in FIG. 2D.

Figure 2C:
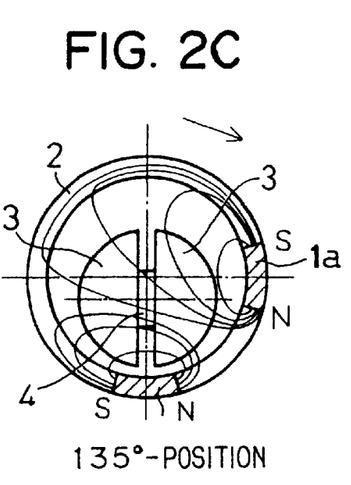
Figure 2D:
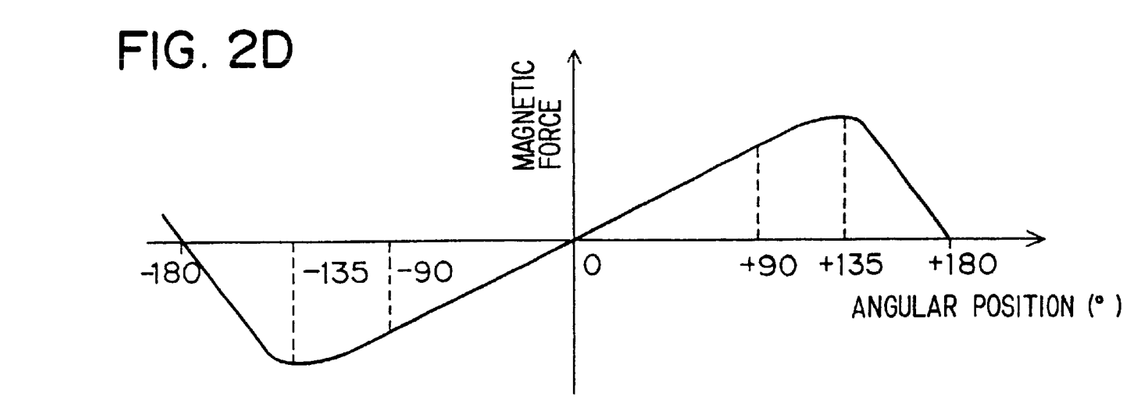

When the rotor further rotates and the direction of the magnetic flux in the inside of the rotor becomes nearly perpendicular to the direction of magnetism detection by the magnetism detection element 4, as shown in FIG. 2C, the detected magnetic force reaches its peak when the rotor is in some angular position (for example, '135°—position') as shown in FIG. 2D. Thereafter, if the rotor further rotates, the detected magnetic force decreases in a higher rate, and it becomes zero when the rotor rotates up to '180°—position'.

As a result, linear output can be provided over a range wider than that of '0°—position'±90°.

The first magnet 1a and the second magnet 1b are disposed in such positions that the central angle formed between them with respect to the center Or of rotation of the rotor is α, which is assumed to be 90° in the above embodiment. The range of linear output is further wider if α is set to a smaller value, and narrower if α is set to a larger value. Accordingly, α may be arbitrarily set according to applications. However, if α is set to 180°, the detected magnetic force reaches its peak every 180°, and hence the effect of the improvement of expanding the range of linear output cannot be provided. Therefore α must be set to a value less than 180°.

Second Embodiment

Figure 3:
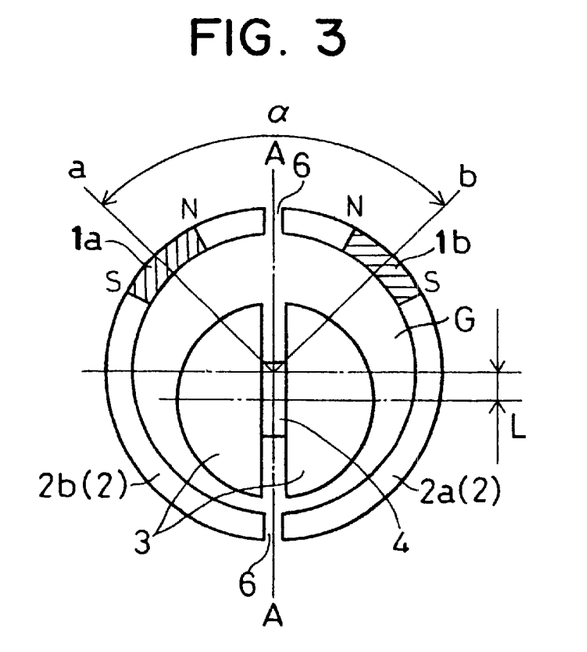
FIG. 3 is a plan view showing a construction of a main part of an angular position detection device according to a second embodiment of the present invention.

FIG. 3 is a plan view showing a construction of a main part of an angular position detection device according to a second embodiment of the present invention. In the second embodiment, the primary yoke 2 of the rotor is cut along the centerline A—A and divided into a right yoke 2a and a left yoke 2b, and gaps 6 are provided between them. In this case, since magnetic reluctance between the right and left yokes 2a, 2b increases due to the gap 6, the adverse effect of demagnetization due to repellence of magnetic flux from the magnets 1a, 1b in the inside of the primary yoke 2 is alleviated.

The gap 6 may be provided only in the upper portion of the primary yoke 2 shown in FIG. 3, because the adverse effect of the demagnetization due to the repellence of the magnetic flux is significant when the distance between the magnets 1a, 1b is short.

Third Embodiment

Figure 4:
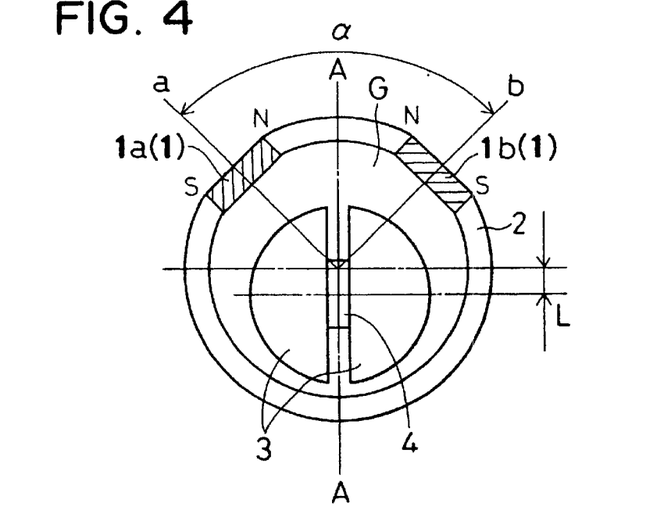
FIG. 4 is a plan view showing a construction of a main part of an angular position detection device according to a third embodiment of the present invention.

FIG. 4 is a plan view showing a construction of a main part of an angular position detection device according to a third embodiment of the present invention. In the third embodiment, the magnets 1 are not arcuate but rectangular (rectangular parallelopiped). In this case, since magnets 1 are manufactured by the simplest forming process and the simplest magnetization process (parallel magnetization), magnets 1 of even and high quality can be manufactured at low cost.

Fourth Embodiment

Figure 5:
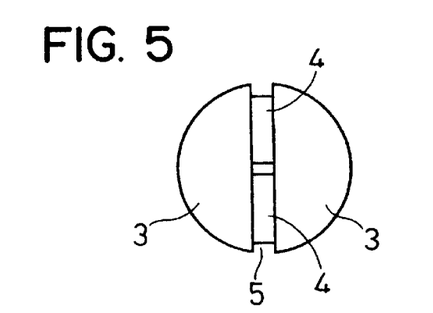
FIG. 5 is a plan view showing a construction of a stator according to a fourth embodiment of the present invention.

FIG. 5 is a plan view showing a construction of the stator according to a fourth embodiment of the present invention. In the fourth embodiment, more than one magnetism detection element 4 is employed.

Since the direction and intensity of the magnetic field in the gap 5 provided between the pair of auxiliary yokes 3 are uniform, a plurality of magnetism detection elements 4 can be disposed in the gap 5 and almost the same angular position signal can be obtained from each element 4. Thus a sensor which has two or more outputs can be constructed. Furthermore, even if one magnetism detection element 4 fails, another magnetism detection element 4 can be used, and hence reliability of the device is improved. Moreover, precision of detection can be improved by comparing outputs from the magnetism detection elements 4.

Fifth Embodiment

Figure 6:
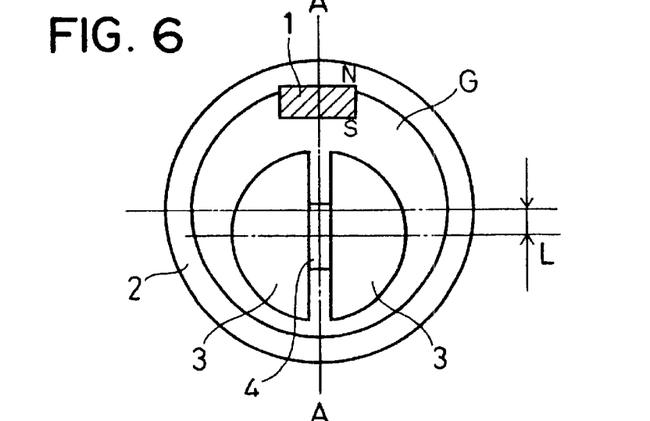
FIG. 6 is a plan view showing a construction of a main part of an angular position detection device according to a fifth embodiment of the present invention.

FIG. 6 is a plan view showing a construction of a main part of an angular position detection device according to a fifth embodiment of the present invention. In the fifth embodiment, only one magnet 1 is used, and it is disposed on inner perimeter side of the primary yoke 2 so that one pole face toward the center of rotation of the rotor.

In this case, by using the one magnet, magnetic flux that flows radially in the primary yoke is produced similarly to the case of using a plurality of magnets, so that linear output can be provided over a range wider than 180° similarly to the first embodiment.

Sixth Embodiment

Figure 7:
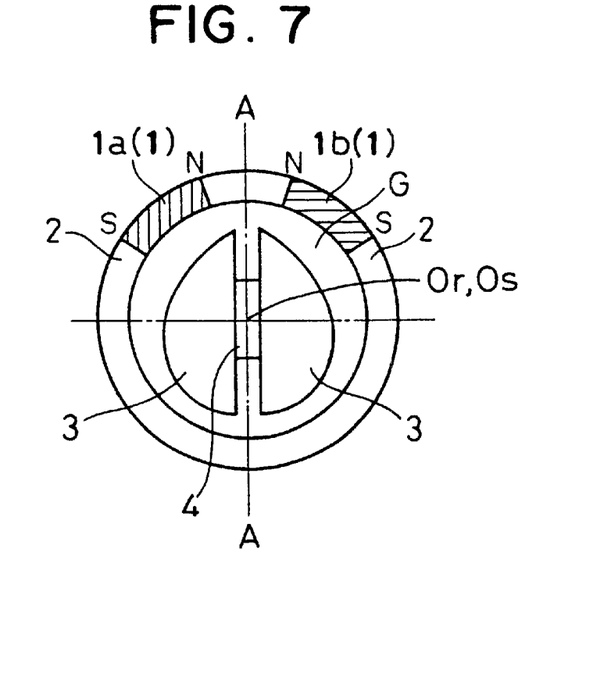
FIG. 7 is a plan view showing a construction of a main part of an angular position detection device according to a sixth embodiment of the present invention.

FIG. 7 is a plan view showing a construction of a main part of an angular position detection device according to a sixth embodiment of the present invention. In the sixth embodiment, the angular position detection device is constructed so that the center Os of the stator is aligned with the center Or of rotation of the rotor and the air gap G between them varies in the circumferential direction.

In order that the air gap G between the magnets 1 and the auxiliary yokes 3 varies with rotation of the rotor, as shown in FIG. 7, the shape of the auxiliary yokes 3 may be changed instead of offsetting the center Os of the stator from the center Or of rotation of the rotor. Alternatively, the shape of the rotor may be changed to a shape (for example, an elliptic cylinder) other than the ring (the shape shown in the first embodiment).

Seventh Embodiment

Figure 8:
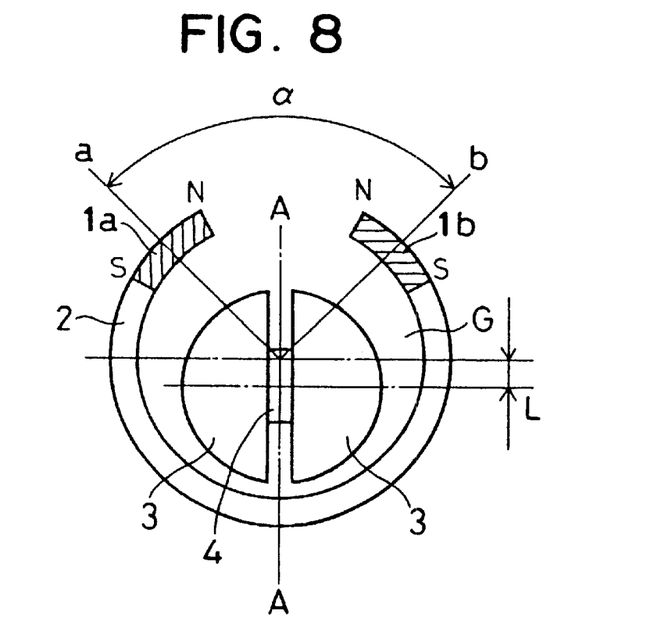
FIG. 8 is a plan view showing a construction of a main part of an angular position detection device according to a seventh embodiment of the present invention.
Figure 9A:
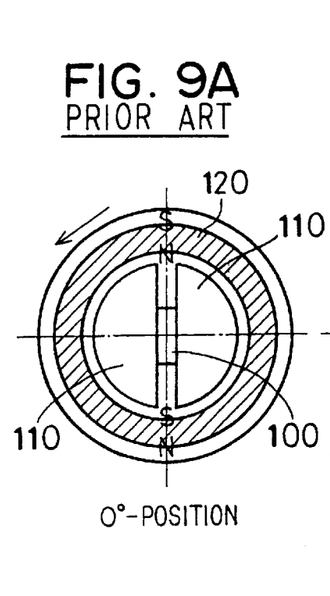
FIGS. 9A to 9D are chars showing a relation between a rotational operation and an output of an angular position detection device according to a prior art.
Figure 9B:
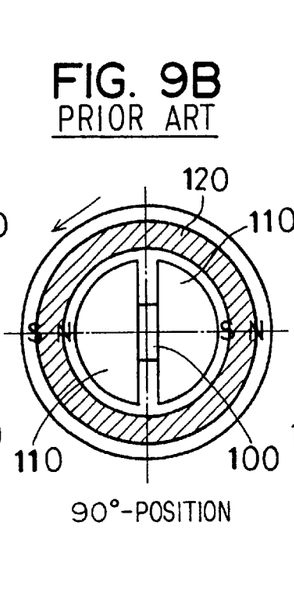
Figure 9C:
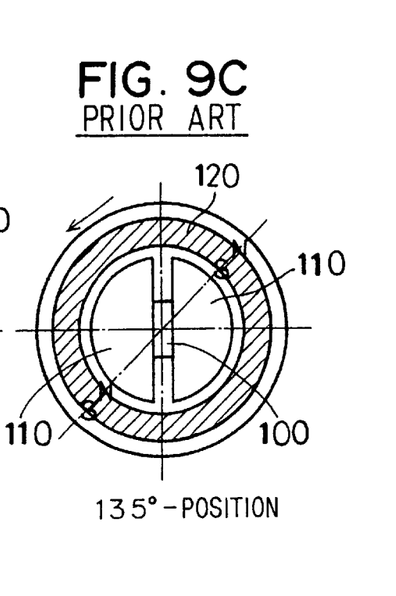
Figure 9D:
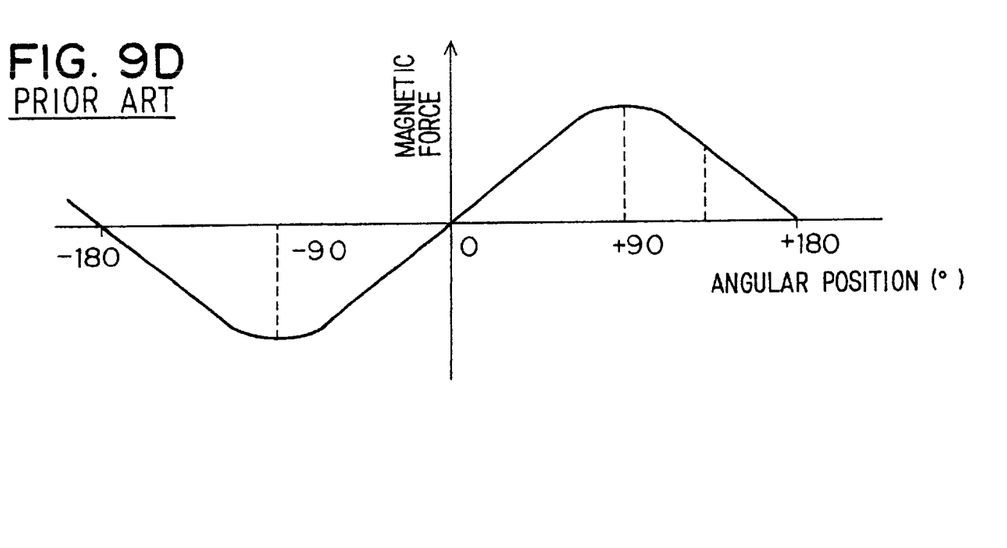

FIG. 8 is a plan view showing a construction of a main part of an angular position detection device according to a seventh embodiment of the present invention. In the seventh embodiment, a portion of the primary yoke 2 is removed between the north pole sides of the two magnets 1a, 1b in contrast to the construction of the rotor explained in the first embodiment.

In this case, similarly to the first embodiment, linear output can be provided over a range wider than 180°.

Modifications

In the above embodiments, the magnets 1 may be disposed with its magnetic poles reversed.

Furthermore, a stator may comprise the magnets 1 and the primary yoke 2 and a rotor may comprise the pair of auxiliary yokes 3 and the magnetism detection element 4, in contrast to the above embodiments in which the rotor comprises the magnets 1 and the primary yoke 2 and the stator comprises the pair of auxiliary yokes 3 and the magnetism detection element 4.

What is claimed is:

1. An angular position detection device comprising a magnet device for generating a magnetic field and a magnetism detection device disposed in the magnetic field for detecting magnetism, one of said magnet device and said magnetism detection device being installed in a stator and the other being installed in a rotor, so that an angular position of said rotor is detected based on an output from said magnetism detection device, wherein said stator or said rotor in which said magnet device is installed is configured so that an intensity distribution of the magnetic field. is asymmetric with respect to a center of rotation of said rotor, and wherein said stator and said rotor are configured so that an air gap between them varies gradually in a circumferential direction.

2. An angular position detection device as in claim 1, wherein said stator or said rotor in which said magnetism detection device is installed includes a pair of auxiliary yokes that induces magnetic flux in said magnetism detection device, wherein a gap is provided between the pair of auxiliary yokes, and wherein said magnetism detection device is disposed in the gap.

3. An angular position detection device as in claim 2, wherein said pair of auxiliary yokes is installed so that a general outer shape of the pair is nearly circular, and a center of the pair is offset from the center of rotation of said rotor.

4. An angular position detection device as in claim 2, wherein said magnetism detection device includes a plurality of magnetism detection elements disposed in the gap provided between said pair of auxiliary yokes.

5. An angular position detection device as in claim 1, wherein said rotor or stator in which said magnet device is installed includes a primary yoke that forms a magnetic circuit of said magnet device, and
wherein said primary yoke is formed in an arcuate shape which has a constant distance from the center of rotation of said rotor.

6. An angular position detection device as in claim 5, wherein said rotor or stator which includes said primary yoke has two magnets as said magnet device, and
wherein said magnets are disposed so that an angle between them with respect to the center of rotation of said rotor is less than 180° and the same poles face each other in the circumferential direction.

7. An angular position detection device as in claim 6, wherein a gap is provided in said primary yoke so that the magnetic circuit is separated between the magnets.

8. An angular position detection device as in claim 5, wherein said rotor or stator which includes said primary yoke has only one magnet as said magnet device, and
wherein said magnet is placed so that one pole of said magnet face toward the center of rotation of said rotor.

9. An angular position detection device as in claim 1, wherein said magnet device has a circular yoke and a pair of magnets arranged in said yoke within a range of 180° with respect to a center of said yoke.

10. An angular position detection device as in claim 1, wherein said rotor and said stator are formed in generally circular shape having different diameters, and
wherein said centers of said rotor and said stator are offset from each other.

11. An angular position detection device as in claim 1, wherein said rotor is fixed to a rotary shaft of a throttle valve.

12. An angular position detection device comprising:
a magnet device for generating a magnetic field;
a magnetism detection device disposed in the magnetic field for detecting magnetism;
rotor shaped annularly and including therein one of the magnet device and the magnetism detection device, the rotor being rotatable around a radial center thereof;
a stator disposed radially inside the rotor and including the other of the magnet device and the magnetism detection device, so that an angular position of said rotor is detected based on an output from said magnetism detection device,
wherein the stator and the rotor are configured so that an air gap between an outer periphery of the stator and an inner periphery of the rotor in a radial direction varies gradually in a circumferential direction.

13. An angular position detection device as in claim 12, wherein:
the stator is shaped generally in a disk having a radial center; and
the radial centers of the rotor and the stator are offset in the radial direction.

14. An angular position detection device comprising:
a rotor shaped generally annularly and including therein a magnet device for generating a magnetic field, the rotor being rotatable around a radial center thereof; and
a stator shaped generally in a disk and disposed inside the rotor in a radial direction, the stator including a magnetism detection device positioned at radial center of the stator for detecting magnetism,
wherein the radial centers of the stator and the rotor are offset in the radial direction so that an air gap between the stator and the rotor in the radial direction varies gradually in a circumferential direction irrespective of rotation of the rotor.

15. An angular position detection device as in claim 14, wherein the stator has a pair of semicircular parts facing each other and sandwiching the magnetism detection device therebetween.

* * * * *

UNITED STATES PATENT AND TRADEMARK OFFICE
CERTIFICATE OF CORRECTION

PATENT NO. : 6,501,265 B2
DATED : December 31, 2002
INVENTOR(S) : Nakamura et al.

It is certified that error appears in the above-identified patent and that said Letters Patent is hereby corrected as shown below:

<u>Title page,</u>
Item [73], should read:

-- [73] Assignee: Nippon Soken, Inc., Aichi-Pref. (JP) and
Denso Corporation, Aichi-Pref. (JP) --

Signed and Sealed this

Eighth Day of April, 2003

JAMES E. ROGAN